Sept. 9, 1969   J. M. LAUNDER   3,466,007
DRINKING VALVE
Filed Oct. 6, 1967   3 Sheets-Sheet 1
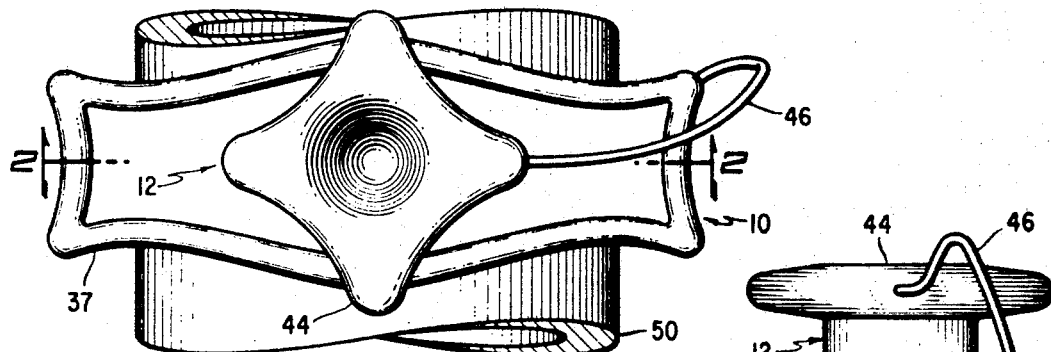
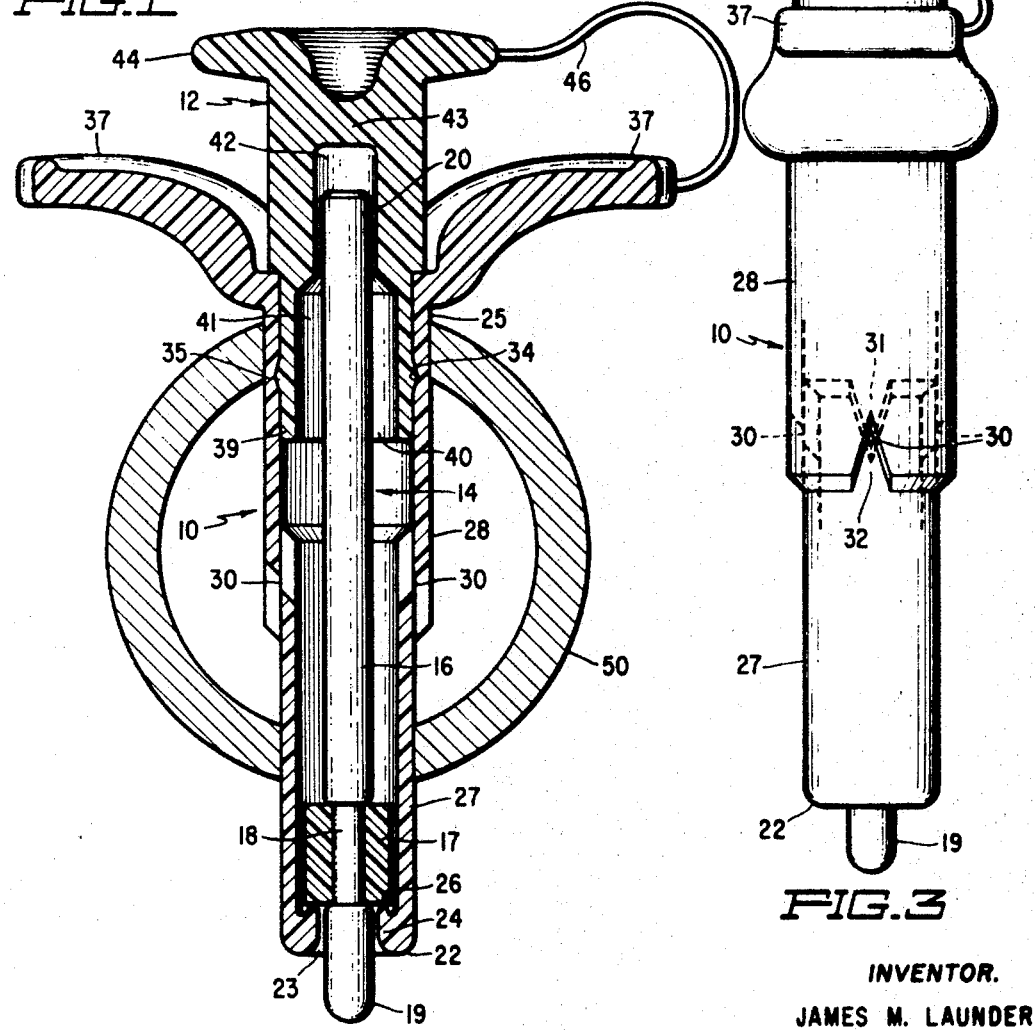
INVENTOR.
JAMES M. LAUNDER
BY
Jeffers and Young
ATTORNEYS Sept. 9, 1969  J. M. LAUNDER  3,466,007
DRINKING VALVE Filed Oct. 6, 1967  3 Sheets-Sheet 2

INVENTOR.
JAMES M. LAUNDER
BY
*Jeffers and Young*
ATTORNEYS

Sept. 9, 1969  J. M. LAUNDER  3,466,007
DRINKING VALVE
Filed Oct. 6, 1967  3 Sheets-Sheet 3
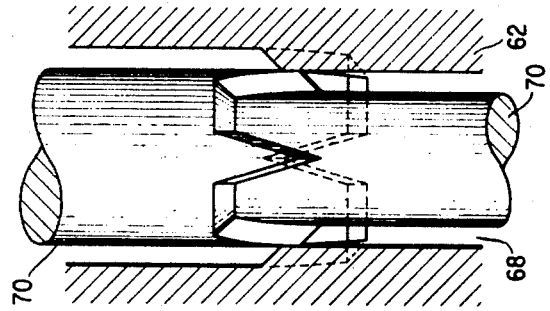
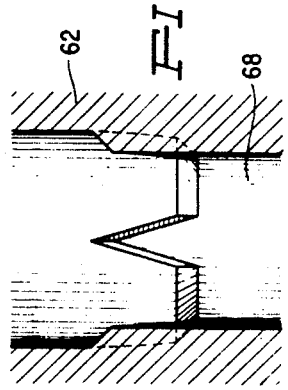
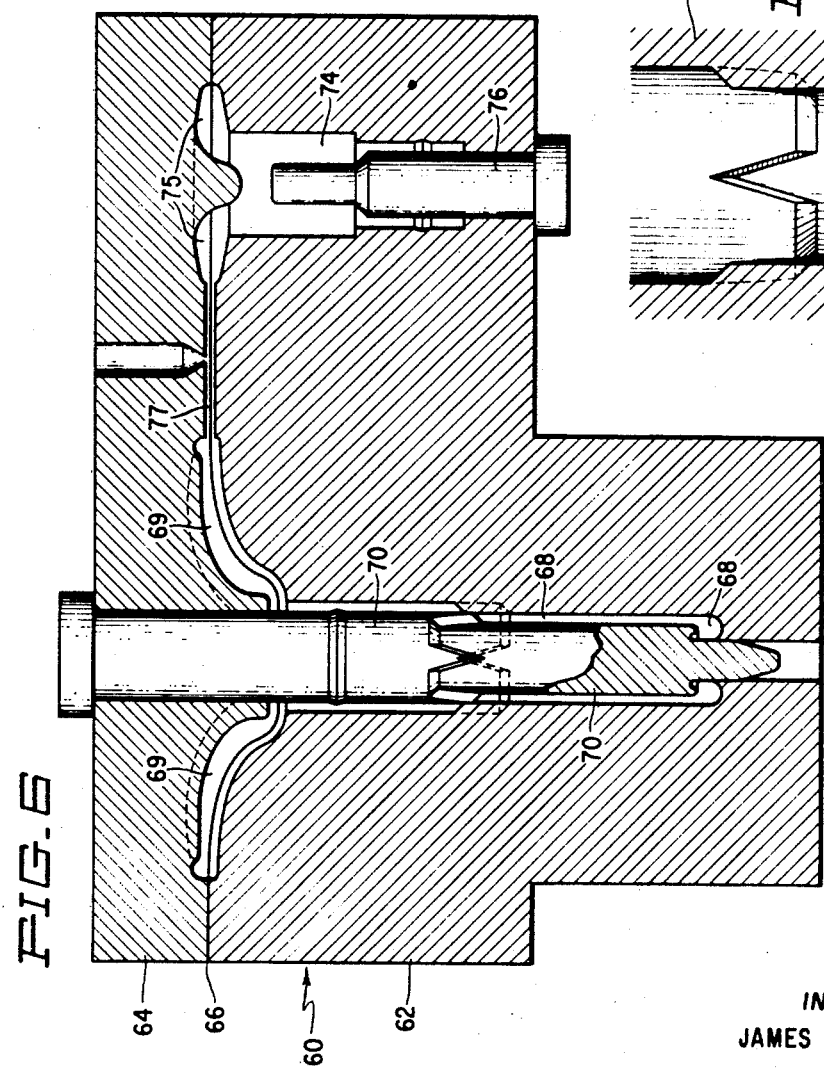
INVENTOR.
JAMES M. LAUNDER
BY
*Jeffers and Young*
ATTORNEYS United States Patent Office 3,466,007
Patented Sept. 9, 1969

3,466,007
DRINKING VALVE
James M. Launder, Wabash, Ind., assignor to HUPSI Corporation, Wabash, Ind., a corporation of Indiana
Filed Oct. 6, 1967, Ser. No. 673,350
Int. Cl. A01k 39/02; F16k 31/56
U.S. Cl. 251—145                                10 Claims

ABSTRACT OF THE DISCLOSURE

A poultry drinking valve is formed by a housing, a plug inserted in the housing, and a sliding valve stem and seal inside the assembled plug and housing. The housing and plug can be molded in one operation, assembled with the stem, and the completed assembly inserted in and removed from a water pipe without threaded connections.

BACKGROUND OF THE INVENTION

My invention relates to an improved water drinking valve, and particularly to an improved water drinking valve for supplying water to poultry and animals on demand.

In animal houses, particularly poultry houses where poultry are kept in cages, water is piped to the cages and made available to the poultry through what is known as a demand-type valve. This presently known demand-type valve is inserted in the water pipe, and supplies water when a valve stem, which faces the poultry cage, is operated. Because of their pecking instincts, the poultry learn that they can obtain water by pecking at the stem. When new and in good condition, these demand-type valves work well, although they are relatively expensive and difficult to install. However, these valves can become defective for various reasons. For example, deposits of minerals and other foreign matter in the drinking water accumulate on the valve, and render the valve inoperative or clogged. When a valve becomes inoperative, it must be replaced immediately in order that the poultry can get water. In order to replace a valve, a poultry house operator may turn off the water supplied to the water pipe before he removes the old valve from the pipe. However, turning off the water is undesirable, and may be catastrophic, because of the large number of poultry affected. Or, the operator may replace a valve while the water in the pipe is still turned on. The present valves are usually made with at least two threads, one to disassemble the valve and a second to install it in the pipe. The operator may disassemble the valve, frequently losing one of the parts, or remove the entire valve. Frequently, the proper thread refuses to release, requiring the use of two wrenches on installation. Two wrenches are needed to prevent excessive tightening of one of the threads. Where, as is usually the case, the valve is held in the water pipe by threaded connections, this is a very difficult, exasperating, and tedious operation. It is very difficult, if not impossible, to thread a piece into a water pipe while the pipe is under pressure and cold water is gushing from the threaded opening. This difficulty is made even greater by the fact that some known valves are in several pieces which are threaded in an opening that faces downward, toward the poultry cage, and away from the operator. This requires the operator to thread one valve piece into another or an entire valve into the pipe by feel and guesswork, both of which are of little help when cold water is gushing out of the pipe. Therefore, many valve pieces are lost under the poultry cages, and when a piece is placed in the pipe, the threads are often stripped or crossed, resulting in an improper seal and water leakage. So at best, the replacement of known demand-type drinking valves has been a difficult and time consuming operation. And, during the time that the operation is being performed, cold water may be gushing out of the pipe opening, a condition which upsets and frightens the poultry, wastes water, and wets the surrounding cages and floor. Although the presently known valves are intended to be installed in threaded holes in the pipe, it has usually been found too difficult to drill and thread the pipe on the job. For this reason, pre-threaded, molded plastic saddles are usually cemented over pre-drilled holes in plastic pipe. This operation increases the cost and results in a high incidence of leakage at the cemented saddle joint which is difficult or impossible to repair satisfactorily under water pressure.

Accordingly, an object of my invention is to provide an improved demand-type drinking valve which can be easily removed from and inserted in a water pipe that is under pressure.

Another object of my invention is to provide an improved demand-type drinking valve which can be easily assembled and inserted in a water pipe without threaded connections.

Another object of my invention is to provide an improved water drinking valve that can be inserted in a water pipe from an accessible and visible location without feel or guesswork.

Another object of my invention is to provide an improved poultry water drinking valve that has fewer parts, that can be cheaply and easily manufactured, and that is easy to assemble and place in operation.

Another object of my invention is to provide an improved demand-type water drinking valve that comprises a plug and housing which can be molded or cast in one operation, and which can be easily assembled with an operating valve stem and seal.

Another object of my invention is to provide an improved poultry water drinking valve which does not require or utilize threaded connections, but which provides a reliable liquid-tight valve.

Another object of my invention is to provide a demand-type water drinking valve having a plug which can be easily removed, while the valve is in a water pipe, to expose the operating stem so that it is accessible to and easily removed by a person's fingers.

SUMMARY OF THE INVENTION

Briefly, these and other objects are achieved in accordance with my invention by an improved valve formed of an elongated, hollow cylindrical housing having a relatively large circular opening at one end and a relatively small circular opening at the other end. The relatively small opening is surrounded by an inwardly facing valve seat. The housing has at least one water supply opening between its ends. A cylindrical plug is provided for insertion into the large opening of the housing. The plug has an opening at its one end that is inserted into the housing, and is closed at its other end. The open end of the plug also has an internal bore. An elongated valve stem having a mounted seal is inserted in the housing with the seal near the valve seat, and the open end of the plug is inserted into the large opening of the housing. The valve stem fits in a sliding relation in the small opening of the housing and in the internal bore of the plug. The assembled valve is inserted in a diametrical opening through the water pipe, with the outer wall of the housing providing a seal for the two openings in the water pipe. The weight of the valve stem and the force of the water pressure cause the valve seal to rest on the valve seat and close the small housing opening. When the valve stem is pushed upward, as by poultry pecking at the exposed end of the valve stem, the valve seal is lifted off of the valve seat, and a drop of water flows to the valve stem where it can be drunk by the poultry.

If a drinking valve becomes defective or inoperative for some reason, it can be easily removed by pulling it from the water pipe, and quickly inserting a new valve into the opening without the necessity of threaded connections. This operation may be preferable because my valve is relatively inexpensive, and can either be discarded or cleaned and repaired. And, the quickness of the operation prevents much water from being lost. Or, the plug may be removed from the housing while the housing remains in the water pipe, the valve stem and seal removed, inspected, and cleaned, or replaced, and the plug then reinserted in the housing. This operation may be preferable where it appears that the old valve is dirty or its seal is defective, and the housing does not need to be replaced. Very little water is lost by this operation. In either case, replacement of the entire valve or replacement of the valve stem and seal is simple and quick.

BRIEF DESCRIPTION OF THE DRAWING

The structure and operation of my invention, together with further objects and advantages, may be better understood from the following description given in connection with the accompanying drawing, in which:

FIGURE 1 shows a top view of my improved drinking valve mounted in a water pipe;

FIGURE 2 shows a cross sectional view of my valve and the water pipe taken along the lines 2—2 in FIGURE 1;

FIGURE 3 shows a side view of my improved drinking valve removed from the water pipe;

FIGURE 6 shows a cross sectional view of a die for forming the plug and housing of my drinking valve in one molding operation;

FIGURE 7 shows an enlarged view of a portion of the die of FIGURE 6; and

FIGURE 8 shows an enlarged view of another portion of the die of FIGURE 6.

DESCRIPTION OF THE PREFERRED EMBODIMENT

Figure 5:
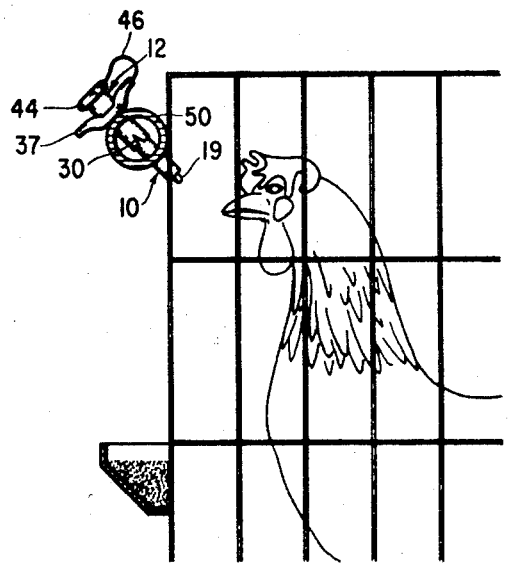
FIGURE 5 shows a cross sectional view of my improved drinking valve and a water pipe positioned near a cage for supplying water to poultry.
Figure 4:
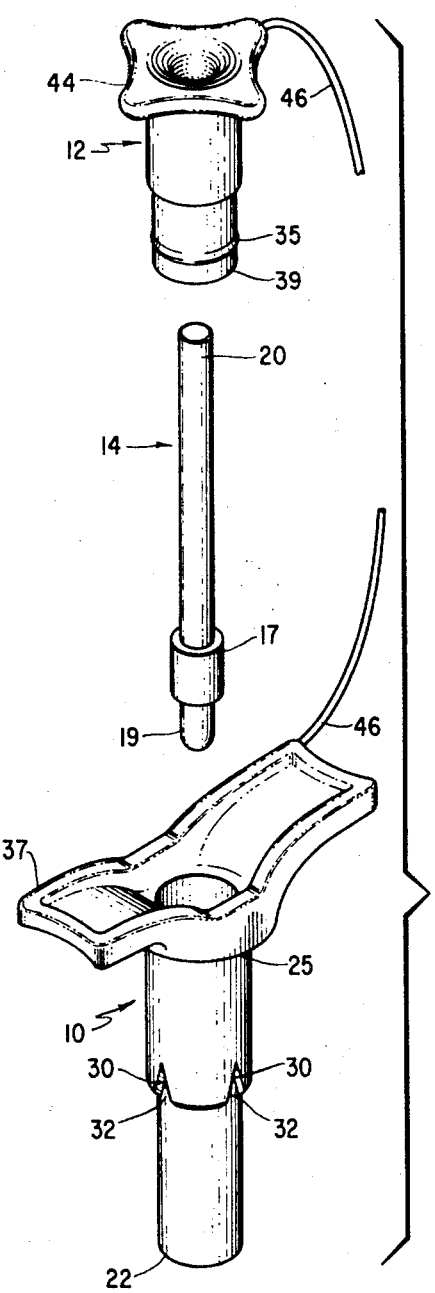
FIGURE 4 shows an exploded perspective view of my improved drinking valve.

As shown in FIGURES 1, 2, 3, and 4, my improved drinking valve is comprised of three parts: a housing 10 and plug 12 molded together as a single part, a valve stem 14, and a seal 17. The housing 10 and the plug 12 are preferably formed of any suitable plastic material such as nylon or Delrin (trade names) which may be cast or molded in a single operation as will be explained. The housing 10 has a hollow, generally cylindrical shape that is symmetrical about its longitudinal axis. One end 22 of the housing 10 is provided with a relatively small circular opening 23 formed by a flange 24 that preferably turns inwardly toward the other end 25 to form a valve seat 26. The opening 23 slidingly receives one end 19 of the stem 14. A cylindrical wall 27 provides a hollow portion extending from the one end 22. Approximately midway between the ends 22, 25, the wall 27 makes a transition and increases in diameter to form a cylindrical wall 28 that provides a hollow portion extending to a relatively large opening at the other end 25. The walls 27, 28 are preferably beveled at their transitions so that the housing 10 can be easily removed from a mold when it is made. A plurality of radial openings 30 are provided in the housing 10 at the transition by V-shaped notches 31 in the wall 27 and V-shaped notches 32 in the wall 28. The openings 30 have a diamond or trapezoidal shape because of the overlap of the V-shaped notches 31, 32. I have shown four openings 30 positioned 90 degrees apart around the housing 10, but more or less openings may be provided. I prefer the openings 30 to be formed as shown because such openings simplify the casting or molding of the housing 10. The wall 28 of the housing 10 is provided with a groove or depression 34 around its internal surface. This groove 34 mates with or receives a correspondingly shaped projection 35 in the plug 12 to hold the plug 12 in position in the housing 10. The housing 10 may include one or more projections or ears 37 fastened to the end 25 to facilitate handling of the housing 10.

The plug 12 has a cylindrical wall 39 which forms an opening 40 at one end. The projection 35 extends around the external surface of the plug 12. The opening 40 is preferably circular in shape, and a bore 41 extends from the opening 40 toward the other end of the plug 12, and ends at a cylindrical bore 42 which slidingly receives the other end 20 of the stem. The plug 12 is closed at its other end 43, and one or more projections or ears 44 may be provided on the plug 12 to facilitate its handling.

The valve stem 14 is formed of an elongated, cylindrical metallic rod 16 which carries a valve seal 17 on a reduced diameter portion 18 near the one end 19. Except at the reduced portion 18, the rod 16 preferably has a constant diameter from the one end 19 to the other end 20. The valve seal 17 is preferably made of a very soft, extremely pliable, rubber-like plastic, such as silicone rubber, to permit it to be easily slipped on the stem 14, and form a good seal against the valve seat 26. The rod 16 is preferably made of brass.

I prefer that the housing 10 and the plug 12 be formed in a single molding operation in order to simplify construction of my valve. I also prefer that the housing 10 and the plug 12 be joined by a tie or similar member 46 so that the housing 10 and the plug 12 will not be separated or lost. However, this tie 46 is not necessary. With respect to FIGURE 4 as well as FIGURES 1, 2, and 3, when my valve is assembled, the valve stem 14 and seal 17 is inserted in the large opening at the end 25 of the housing 10. The end 19 of the stem 14 is moved downward until it extends out of or beyond the small opening 23 at the end 22 of the housing 10. The plug 12 is then inserted into the large opening of the housing 10 with the hole 40 and the bore 42 surrounding the other end 20 of the stem 14. The plug 12 is inserted into the housing 10 until its projection 35 snaps or slides into engagement with the groove 34. The assembled valve then has the appearance shown in FIGURES 1, 2, and 3.

When the valve is placed in a water pipe 50 for operation, the water pipe 50 may be drilled with two circular holes lying on a diameter of the pipe 50 and positioned in opposing walls of the pipe 50. One hole has a diameter in one wall which sealingly receives the wall 27 of the housing 10, and the other hole has a diameter in the other wall which sealingly receives the wall 28 of the housing 10. These holes may be drilled through a plastic water pipe while the pipe is under pressure, if appropriate electrical grounding precautions are taken. The holes may be drilled by using bits of two different diameters, or by using a single bit which is shaped to provide the two sizes of holes in the walls. With the holes drilled in the pipe 50, the assembled valve may be inserted by placing the end 22 in the larger hole and pushing the valve until the end 22 passes out of the smaller hole and beyond the opposite wall of the pipe 50. At this point, the wall 28 at the end 25 of the housing 10 is sealingly positioned in the large hole in the pipe 50, and the wall 27 of the housing 10 is sealingly positioned in the small hole in the pipe 50. The seal between the walls 27, 28 and the pipe 50 may be improved by providing a slight taper to the walls 27, 28 and to the holes in the pipe 50. The valve mounted in the pipe 50 is shown in the cross sectional view of FIGURE 2.

FIGURE 5 shows my valve and the water pipe 50 positioned with respect to a poultry cage. In FIGURE 5, it will be seen that the longitudinal axis of the valve is oriented downward at some angle around 45 degrees so that the lower end 19 of the stem 14 is accessible to poultry in the cage. If the housing 10 and the plug 12 are made of a low friction plastic material and the rod 16 is made of brass, the stem 14 slides very easily in the supports provided by the opening 23 and the bore 42. With the longitudinal axis of the valve oriented at a slight downward direction, the stem 14 is pulled downward by gravity so that its seal 17 engages the seat 26 and forms a watertight junction. This is aided by pressure of the water in the pipe 50 which flows through the openings 30 into the housing 10 to the inner face of the seal 17. When poultry wish to drink, they can peck at the end 19 of the stem 14 so that the seal 17 moves upward, and water in the pipe 50 flows through the openings 30 into the housing 10, and out of the opening 23. Gravity then causes the stem 14 to move downward again, so that the seal 17 engages the seat 26 and closes the opening 23.

The position and orientation of the valve as shown in FIGURE 5 show why it was formerly so difficult to thread the valve pieces into the pipe 50, particularly when one piece had to be threaded from behind and below the pipe 50 by an operator outside of the poultry cage. However, with my valve, an old valve may be easily removed by pulling on the projections 37 and removing the entire assembled valve; or by pulling on the projections 44 and removing only the plug 12 in order to clean or replace the stem 14. In either case, removal and replacement, as well as initial installation, are relatively simple and rapid. And, removal and replacement are easily and quickly made even though water in the pipe 50 may be under pressure. This is because the entire valve is inserted from the readily accessible side of the pipe 50, and because no threads have to be mated and turned.

FIGURES 6, 7, and 8 show cross sectional views of a mold or die 60 which can be utilized to form the particular housing 10 and the plug 12 shown in FIGURES 1 through 5 in one molding or casting operation. I prefer that the housing 10 and the plug 12 be formed of a plastic material such as nylon or delrin, since that material has the desired characteristics for the valve and can be readily molded by known injection molding techniques. The die 60 comprises a lower block 62 and an upper block 64 which fit together or mate at a common parting line 66. The lower block 62 is provided with an opening 68 which receives a core 70 on the upper block 64 to form the housing 10. The opening 68 in the block 62 is shaped at its transition portion as shown in FIGURE 7 with the notches and sloped or beveled edges, and the core 70 of the upper block 64 is shaped at its transition portion as shown in FIGURE 8 to fit within the opening 68 in the block 62. These transition portions are preferable in order to form the openings. If a simple opening and core are used, the inserts which form the openings must be movable in and out in order to remove the finished piece from the opening and core. However, either the arrangement shown or movable inserts may be used, depending upon the casting techniques preferred, and any number of openings may be provided. The beveled edges at the transition portions in the opening 68 and in the core 70 facilitate removal of a finished piece from the die 60, and provide accurately located and formed openings 30. An additional opening 74 with a core 76 is also provided in the block 62 to form the plug 12. The opening 74 is provided with a groove to form the projection 35 in the plug 12, and the core 70 is provided with a projection which forms the groove 34 in the housing 10. The projection 35 and the groove 34 are not essential, but may be provided in order to provide a snap fit between the plug 12 and the housing 10 to indicate that the plug 12 and the housing 10 from being forced out by water pressure. Openings 69, 75 are provided at the top of the block 62 and at the bottom of the block 64 to form the ears or projections 37, 44 on the housing 10 and the plug 12 respectively. These openings 69, 75 are joined by a groove 77 which forms the tie 46. The plastic material may be injected into groove 77 by a sprue.

It will thus be seen that my improved valve simplifies the production of demand-type drinking valves, and provides a valve which can be easily and quickly inserted by an operator in a water pipe. My valve may be easily inserted in a new water pipe by drilling a diametrical hole completely through the pipe from one direction, and quickly inserting the assembled valve, even though the water pipe may be under pressure. If a valve needs replacing it may be easily and quickly removed from an accessible location, and a new valve inserted. Or, only the plug may be removed from the valve, the stem cleaned and replaced, and the plug reinserted. It will also be noted that my valve provides improved operation because of the relatively long stem, and the relatively widely separated supports provided for the stem at the opening 23 and the bore 42. This relatively long distance between supports permits the stem to operate freely even though the housing is deformed.

Persons skilled in the art will appreciate that modifications may be made to my invention. For example, the housing may have other shapes, and may have only a single outer diameter, or a single long taper. The plug may take the form of a cap and the housing may be shaped and dimensioned so that this cap is installed over the end of the housing. The openings may be formed in the housing in different shapes and locations, or may be drilled after a completed housing is cast. The plug may have different shapes, and the mating projection and groove in the plug and housing may be omitted. Also, the tie between the plug and the housing may be omitted.

What I claim as new and desire to secure by Letters Patent of the United States is:

1. An improved demand-type liquid valve for insertion in a pipe, comprising:
  (a) an elongated, hollow cylindrical housing formed of a plastic material, said housing having a relatively large circular opening at one end, said housing having a relatively small circular opening at the other end surrounded by an inwardly facing valve seat, and said housing having at least one opening between said ends;
  (b) a cylindrical plug formed of a plastic material, said plug being open at one end and having an internal bore extending therefrom toward the other end of said plug, said plug being closed at said other end, and said plug having a diameter at said one end that permits said one end of said plug and said one end of said housing to be joined in an inserted relation; and
  (c) an elongated stem having a seal positioned thereon near one end thereof, said one end of said stem being dimensioned to movably fit in said relatively small circular opening with said seal movably near said housing valve seat within said housing, and the other end of said stem being dimensioned to movably fit in said plug internal bore movably near said other end of said plug.

2. The valve of claim 1 wherein said housing further comprises members extending therefrom near said one end and said plug further comprises members extending therefrom near said other end to handle said housing and said plug.

3. The valve of claim 1 wherein said housing and said plug are joined by a tie between said one end of said housing and said other end of said plug.

4. The valve of claim 1 wherein said stem is formed of a metallic rod and said seal is formed of a relatively soft plastic material for engaging said valve seat.

5. An improved valve adapted to be diametrically inserted in a water pipe for supplying water to poultry therefrom, comprising:

(a) an elongated, hollow housing having a cylindrical wall symmetrically positioned about its longitudinal axis, said housing having a circular drinking opening at one end surrounded by a circular flange that forms an inwardly facing valve seat symmetrically positioned about said longitudinal axis, said housing having a cylindrically shaped plug opening extending along and symmetrically about said longitudinal axis from the other end, and said housing wall having at least one opening between said ends;

(b) a plug having an outer wall that is cylindrically shaped and symmetrically positioned along its longtudinal axis and that is adapted to be assembled in said plug opening and provide a water-tight seal therewith, said plug being closed at one end and having an internal bore extending from the other end toward said one end, said internal bore being symmetrically positioned about said plug longitudinal axis and at least a portion thereof having a circular cross section;

(c) an elongated, cylindrically shaped valve stem having one end adapted to slidingly fit in said drinking opening and the other end adapted to slidingly fit in said circular cross section portion of said internal bore when said housing and plug are assembled; and (d) a cylindrically shaped valve seal adapted to be positioned on said valve stem near said one end thereof for operable, sealing engagement with said valve seat when said valve stem is positioned in said assembled plug and housing.

6. The improved valve of claim 5 wherein said housing, said plug, and said valve seal are formed of a plastic material and wherein said valve stem is formed of a metallic material.

7. The improved valve of claim 5 wherein said circular flange on said housing extends toward said other end thereof to form a cylindrical portion with said valve seat positioned at the inward end thereof.

8. The improved valve of claim 5 wherein a selected one of said housing and said plug is provided with a projection that limits the distance that said plug can be assembled into said housing.

9. The improved valve of claim 5 wherein said housing and said plug have respective manipulating portions, and wherein said housing and said plug are joined by a flexible tie.

10. The improved valve of claim 5 wherein said housing comprises a plurality of radially oriented openings between said ends at a location that will be inside said water pipe when said valve is inserted therein.

References Cited

UNITED STATES PATENTS

| | | | |
|---|---|---|---|
| 2,486,729 | 11/1949 | Beckley | 251—339 X |
| 2,710,594 | 6/1955 | Thompson | 251—339 X |

FOREIGN PATENTS

| | | |
|---|---|---|
| 74,465 | 7/1952 | Denmark. |

M. CARY NELSON, Primary Examiner

W. R. CLINE, Assistant Examiner

U.S. Cl. X.R.

119—72.5; 251—339